No. 659,923. Patented Oct. 16, 1900.
G. HOEPNER.
AUTOMATIC WEIGHING MACHINE.
(Application filed Oct. 2, 1899.)
(No Model.) 2 Sheets—Sheet 1.
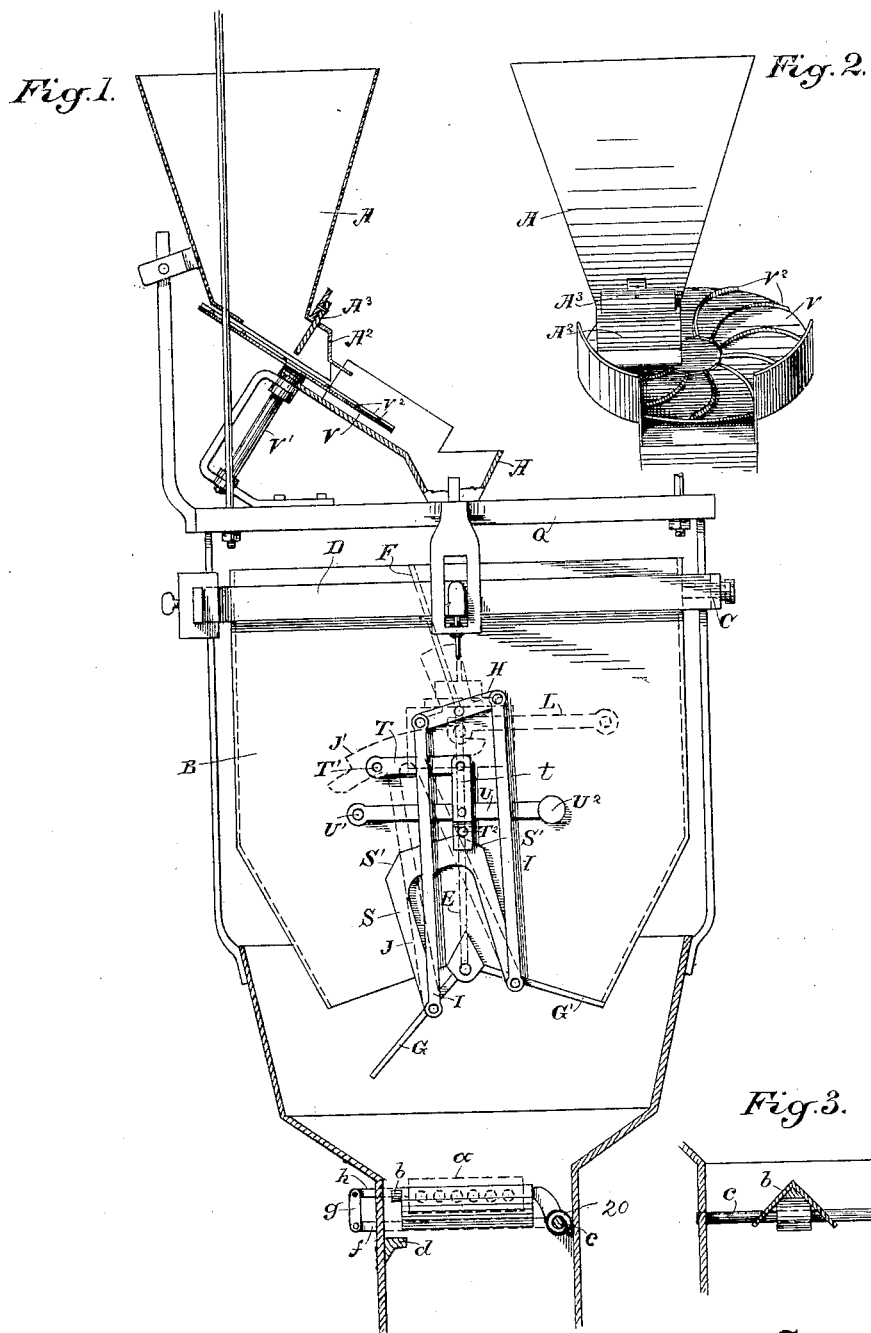

No. 659,923. Patented Oct. 16, 1900.
G. HOEPNER.
AUTOMATIC WEIGHING MACHINE.
(Application filed Oct. 2, 1899.)
(No Model.) 2 Sheets—Sheet 2.
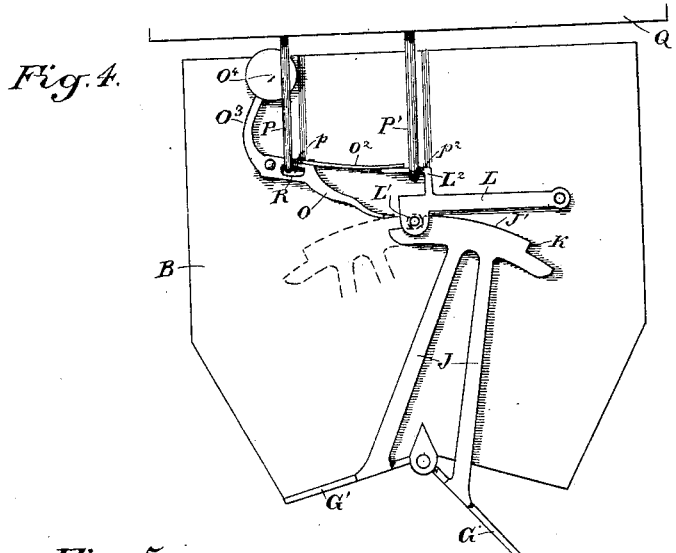
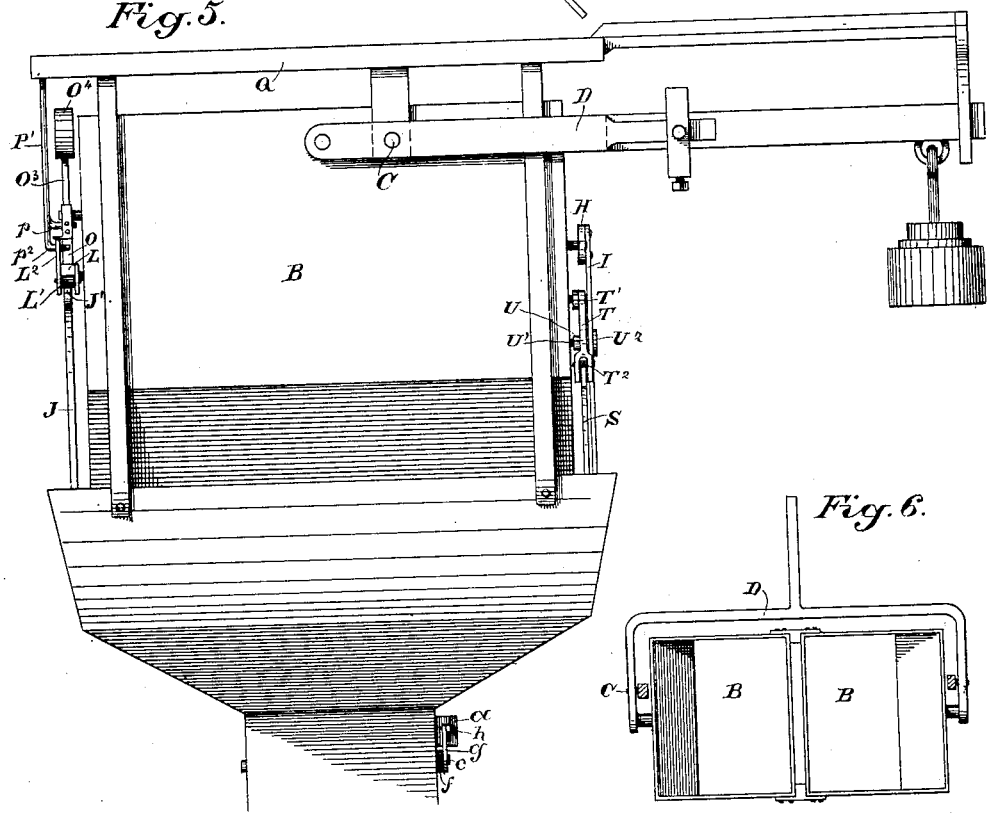
Witnesses,
J. H. Knuse
H. F. Ascheck
Inventor,
George Hoepner
By Dewey Strong & Co.
attys

UNITED STATES PATENT OFFICE.

GEORGE HOEPNER, OF SAN FRANCISCO, CALIFORNIA, ASSIGNOR TO THE UNION SCALE AND MANUFACTURING COMPANY, OF SACRAMENTO, CALIFORNIA.

AUTOMATIC WEIGHING-MACHINE.

SPECIFICATION forming part of Letters Patent No. 659,923, dated October 16, 1900.

Application filed October 2, 1899. Serial No. 732,306. (No model.)

*To all whom it may concern:*

Be it known that I, GEORGE HOEPNER, a citizen of the United States, residing in the city and county of San Francisco, State of California, have invented an Improvement in Automatic Weighing-Machines; and I hereby declare the following to be a full, clear, and exact description of the same.

My invention relates to improvements in machines of that class which are designed to weigh powdered, granular, or similar substances and to deliver such substances in regular quantities into such receptacles as may be desired.

It consists of a weighing-receptacle, means for supplying the material to be weighed thereto, a fulcrumed scale-beam with adjustable weights, from one end of which the receptacle is suspended, a plurality of chambers within the receptacle, a tilting partition, and mechanism by which this partition is alternately moved from one side to the other, so that material arriving from the source of supply will first fill the chamber upon one side of the partition until the given weight has been reached and will then be transferred to the other side, thus alternating without interruption.

It also comprises mechanism by which an even feed is maintained, mechanism by which the parts are actuated and locked intermediate of their movements, and details of construction, all of which will be more fully explained by reference to the accompanying drawings, in which—

Figure 1 is a side elevation of the scale, the feeder and registering device being shown in section. Fig. 2 is a front view of the feed device. Fig. 3 is a section through the registering-operator at right angles to Fig. 1. Fig. 4 shows the opposite side of the weighing-receptacle from Fig. 1. Fig. 5 is a front elevation of the scale. Fig. 6 is a plan view of a modified form of the weighing-receptacle.

A is a source of supply, which may be a conical hopper, into which any desired amount of material may be placed, or a chute or other conveyer. From this source of supply material is delivered into the weighing-receptacle B, which is here shown as suspended by suitable bearings in a fork or yoke D, which extends along upon each side of the upper part of the weighing-receptacle and is fulcrumed to a fixed support, as shown at C, so that it may tilt about this support and allow the weighing-receptacle to sink when the amount of material within it is sufficient to overcome the weights, which are carried by the opposite end of the scale-beam in any usual or suitable manner.

The weighing-receptacle may be made in one or more sections, or it may be made as a single structure having a diaphragm or partition E extending vertically from the bottom upward. Upon the upper edge of this partition is fulcrumed a gate F, which extends horizontally across from side to side of the receptacle and which by suitable mechanism is caused to tilt beneath the source of supply A, so that the material arriving through said source will be alternately diverted to one side or the other of the partition E. At the bottom of this partition is fulcrumed the tilting structure, composed of two plates G G', so disposed with relation to each other that when one of them closes against the bottom of its chamber the other will be opened.

The fulcrum-shaft of the gate F has across its outer end a yoke H, and this yoke is connected by rods or links I, with corresponding connections, to the tilting bottoms G G', so that when the gate F has been tilted to allow the discharge from A to pass upon one side of the partition E the bottom of that part of the receptacle will be closed, and when the gate F has been tilted to the opposite side to deliver the material into the other compartment the bottom upon that side will be closed and the bottom of the first-named compartment will be opened to allow the material to escape therefrom.

The connecting-rods I and the yokes H form a parallel-motion mechanism, which insures the proper movement of these parts.

The locking of the bottoms in their closed position and the releasing of them to allow the shifting of the partition and connected parts are effected as follows:

J is an arm connecting with the bottoms G G' or with their fulcrum-shaft, and at the top of this arm is formed a segment J', the ends of which are cut down to form shoulders, as shown at K.

L is an arm fulcrumed upon the side of the weighing-receptacle B, and its free end is adapted to engage either one or the other of the notches K of the segment J', and thus temporarily hold the segment in position to which it may have been tilted, and when the parts are in this position they act as a lock to retain one bottom closed and the other open.

For convenience and ease of operation I have shown an antifrictional roller L' journaled in this end of the lever-arm L. Fulcrumed to the weighing-receptacle B upon the opposite side of the center from the lever L is another arm O, the free end of which approaches the free end of the arm L. This arm L has an arm $L^2$ projecting from it in such a manner that when the arm O is lifted it will engage the arm $L^2$, and thus lift the arm L and disengage the roller L' from the notch K, with which it may be engaged. An arm $O^3$ extends vertically upward in line with the fulcrum of the arm O and carries upon it a weight $O^4$, which is normally approximately in line above the fulcrum-point; but when the arm O is tilted so that its free end contacts with the bent arm $L^2$ this weight, falling to one side of its vertical line of support, gives a sudden movement to the lever, which causes it to strike the arm $L^2$ sharply, and thus insure the disengagement of the latch L'.

P P' are suspending-rods, the upper ends of which are fixed to a permanent part of the structure, as at Q. The lower end of the rod P has a pin which enters a slot R, made in the arm O between its fulcrum-point and its movable end. The arm P' is correspondingly formed to engage with the bent arm $L^2$ of the lever L, it being understood that the rods P and P' are fixed, while the weighing-receptacle is capable of a certain amount of vertical movement, sinking when the weight within it overcomes the weights upon the scale-beam and rising when the receptacle is emptied, when the falling action will take place. When one of the compartments has become sufficiently filled to cause the receptacle to sink, and it will move down a little way, depending upon the size of the slot R, into which the pin of the arm P projects, this slot being made purposely deeper than the diameter of the pin, so that the weighing-receptacle may sink a short distance before it acts. As soon as the upper side of the slot R strikes the pin $p$ the latter, being stationary, will lift the lever O, turning it about its fulcrum-point until its free end strikes the bent arm $L^2$ of the lever L, and at approximately the same instant the pin $p^2$ of the rod P' will contact with this bent arm $L^2$. This action serves to lift the lever L and disengage it from the notch K, thus freeing the arm J, and the weight upon the bottom of the compartment which was being filled will then open this bottom and close the opposite one.

This motion simultaneously tilts the arm J, and the roller L' will travel over the segmental arc J' until it drops onto the notch K at the opposite end of the segment, when the position of the bottoms will have been changed, the one belonging to the empty compartment being closed and the other being opened to allow of the discharge of the contents of its compartment. The swinging gate F is also simultaneously changed, so that the material will be diverted into the empty compartment, which will then commence to fall.

Upon the opposite side of the weighing-chamber from the mechanism just described is another mechanism, which consists of a rectangular frame S, having its upper angles cut off diagonally, as shown at S'. This frame is tilted in unison with the movements of the bottoms G G' and with the movements of the arm J and the locking-segment J'.

T is an arm fulcrumed to the side of the weighing-receptacle, as shown at T', and its opposite end is pivotally connected with a link or arm $t$, adapted to rest upon one or the other of the diagonal surfaces S' when the frame S has been tilted to bring either of these surfaces beneath it. For convenience and freedom of motion of these parts an antifriction-roller is journaled in the movable end of the arm $t$, as shown at $T^2$.

U is a second arm having one end fulcrumed to the side of the weighing-receptacle, as shown at U', and having a weight $U^2$ adjustably mounted upon its opposite end. This arm U is pivoted to the arm $t$, as shown. The office of this mechanism is to retard and assist in holding the parts heretofore described in position while either of the compartments of the weighing-receptacle is being filled, and the pressure of the end of the arm $t$ upon the diagonal surface or edge S' of the tilting frame S serves this purpose; but as soon as the receptacle has sunk, by reason of the weight within it overcoming the weight of the scale-beam, the disengagement of the parts upon the opposite side is accompanied by a similar disengagement of this retarding mechanism by reason of the roller at $T^2$ moving up the incline until it rests upon the straight upper edge of the frame S between the two diagonal surfaces S'. Then the action of these parts will be to facilitate the tilting of the doors until one has been partially closed and the other partially opened, when the roller $T^2$ will rest upon the opposite incline S' and again perform its service. When the receptacle again rises by reason of its contents having escaped and the superior weight on the scale-beam acting upon it, the stationary rods P and P' remaining in their position, the lever-arm O will be again pushed down by the contact of the pin $p$ with the bottom of the slot R of said arm, and a spring-arm $O^5$, which projects from the arm O, will contact with the bent arm $L^2$ of the lever L, thus insuring a sufficient pressure to cause the roller L' to drop promptly into the notch or depression K when the latter arrives beneath it and to thus lock the parts in their new position.

In the feeding of certain materials to this apparatus it has been found difficult to cause the substances to flow freely. In order to insure a proper discharge of the material, I have interposed between the supply and the delivery into the weighing-receptacle a disk V, which is journaled in a plane considerably inclined to the horizontal. The disk is freely turnable in this diagonal plane upon a shaft V' and has upon its surface small raised ribs or pins $V^2$, which are here shown as curved from the center toward the periphery. One side of this disk lies beneath the supply-chute $A^2$, and this chute is provided with an adjustable gate $A^3$, by which the flow from the main source through the chute is regulated in the first instance. The material passing through this chute $A^2$ falls upon one side of the inclined journal-disk V, and the projections $V^2$ act as a slight check to the flow of the material, which thus causes the disk to revolve upon its axis, and the material flows down therefrom over the disk and is delivered into the chute or connection, from which it passes into the weighing-receptacle. The projections $V^2$, which are low, serve as agitators for the material passing over them, the rotation of the disk causing these projections to constantly sweep beneath the material which is passing out of the chute $A^2$, and if there is any tendency of the material to pack or clog at this point these projections will again start it and cause it to continue flowing, thus preventing any stoppage at this point.

$a$ is a registering mechanism of any suitable or well-known construction adapted to indicate and keep a record of the number of loads which may have passed through the apparatus.

This device is automatically actuated as follows: Within the discharge-chute and in the path of the material delivered from the weighing-bucket is an arm $b$, so formed and positioned that the falling material will strike and depress it. This arm is fixed at one end to a shaft $c$, which is turned a short distance by each depression of the arm $b$. A stop $d$ limits the amount of depression of the arm and serves as a support for its free end until the material has all passed from the weighing-bucket, when it will be allowed to rise and assume its normal position. From the outer end of the shaft $c$ an arm $f$ extends and is connected by a link $g$ with an arm $h$, which in turn connects with a movable part of the register, so that each depression of the arm $b$ by a passing load will advance the register one point and record it. A spring 20 of sufficient strength is connected with some portion of the mechanism and returns it to its normal position after each depression of the arm.

Having thus described my invention, what I claim as new, and desire to secure by Letters Patent, is—

1. In a weighing-receptacle, the combination of a compartment weighing-bucket having pivoted bottoms controlling the discharge of material, an oscillating member at one side of the receptacle having locking-surfaces, locking means engaging one of said surfaces at the completion of each oscillation of the member, means dependent upon the sinking of the receptacle for automatically releasing the locking devices, a second oscillating member on the opposite side of the receptacle and connected with the bottoms, and a retarding device for this second member released by the member itself as it oscillates from one position to another in unison with the oscillation of the first-named member.

2. A weighing-receptacle having compartments and swinging bottoms controlling the discharge thereof, an oscillating member connected with the bottoms and having retarding-surfaces, and a weighted device adapted to rest on one of said surfaces at the completion of each oscillation of the member, and to be released from the engaged surface by the movement of the member itself when the opening of the bottom causes the member to oscillate.

3. The combination of a compartment weighing-receptacle, swinging bottoms controlling the discharge from each compartment, an oscillating member connected with said bottoms and having inclined surfaces at its upper angles, and a weighted lever having a link or arm to engage one of said inclined surfaces at the completion of each oscillation of the member, whereby when the member oscillates in unison with the opening of a bottom the engaged inclined surface rides under the link or arm and raises the weighted lever to enable said surface to become disengaged from said link or arm, and the oscillating member to be released from its position.

4. The combination of a weighing-receptacle having compartments with swinging bottoms, an oscillating segment connected with said bottoms and having notches at its upper angles, a lever pivoted at one end and having its free end to engage one of said notches at the completion of each oscillation of the segment, a second lever fulcrumed between its ends, having one end lying in the path of the free end of the first-named lever and having a weight upon its opposite end normally approximately in line above the fulcrum of said second lever, and means connecting the second lever with a stationary part whereby the sinking of the receptacle tilts the second lever to enable the weight thereon to throw the lever into contact with the free end of the first-named lever and thereby release the segment from its locked position.

5. In a weighing apparatus, a weighing-receptacle, a yoke from which it is suspended having a scale-beam projecting from it, a source of supply, means for delivering the material from the source of supply into the weighing-receptacle, a tilting diaphragm movable to form receiving-chambers alternately upon opposite sides, fulcrumed bottoms connected and movable with the diaphragm, a notched segment fulcrumed on the axes of the bottoms, a latch adapted to engage the notches in the segment and thereby hold the latter and the bottoms in either position to which they are moved, said latch having a bent projecting arm, a lever fulcrumed to the weighing-receptacle having its free end adapted to engage the bent arm and disengage the latch and a fixed suspending-rod by which said lever is actuated when the receptacle sinks.

6. In a weighing apparatus, a weighing-receptacle, a yoke from which it is suspended having a scale-beam projecting from it, a source of supply, means for delivering the material from the source of supply to the weighing-receptacle, a tilting diaphragm and fulcrumed bottoms connected and movable in unison therewith, a notched segment fulcrumed and turnable in unison with the movement of the bottoms, a latch adapted to engage the notches in the segment and thereby hold the bottoms in either position to which they are moved, a disengaging arm fulcrumed to the receptacle with its free end adapted to engage and raise the latch, a fixed rod having one end adapted to engage the swinging arm when the weighing-receptacle sinks whereby the arm is moved to disengage the latch and allow the position of the bottoms to reverse and a weight carried by said arm, and movable to either side of the vertical plane of its fulcrum-point by the tilting of the arm.

7. In a weighing apparatus, a weighing-receptacle, a yoke and scale-beam, a source of supply, a tilting diaphragm movable to form receiving-chambers alternately upon opposite sides, and fulcrumed bottoms movable in unison therewith whereby one chamber is closed and the other is opened, a notched segment fulcrumed and movable in unison with the bottoms, and a latch adapted to engage the notches in the segment and thereby hold the latter and the bottoms in either position to which they are moved, said latch having a bent arm projecting from its movable end, an arm fulcrumed to the receptacle having its free end adapted to engage the bent arm of the latch, and lift the latter when the receptacle sinks, fixed rods engaging the arm and the latch and a tilting weight connected with the arm whereby the sinking of the receptacle disengages the latch and allows the bottoms to reverse their positions, and a spring connecting with the arm contacting with the latch whereby the rising of the receptacle acts to engage the latch with the notched segment.

8. In a weighing apparatus, a vertically-movable weighing-bucket with dividing-partition, a suspended yoke from which the receptacle is hung having a scale-beam projecting from it, a fulcrumed tilting and directing top section, bottoms connected and movable in unison therewith to alternately close and open the chambers, a swinging segment fulcrumed on the axes of the bottoms having its upper surface notched, a retaining-latch adapted to engage said notches to hold the segments and bottoms locked in either position, and a supplemental rectangular frame having diagonal surfaces at the upper angles movable with the bottoms, and a fulcrumed weighted arm having its end adapted to rest upon said angles when the parts are locked in either position.

9. In a weighing apparatus, a vertically-movable weighing-bucket, a yoke from which it is suspended with a scale-beam projecting from it, a source of supply and means for delivering the material from the source of supply into the weighing-receptacle, consisting of an inclined disk having radial curved projections over which the material passes and by which it is prevented from clogging.

10. In a weighing apparatus, the compartment weighing-bucket, tilting bottoms, and rocking directing-gate whereby the compartments are alternately filled and emptied, mechanism by which the gate and bottoms are automatically changed upon the filling of either compartment, main and supplemental locking devices one on one side and the other on the opposite side of the weighing-bucket and both acting in unison to retain the parts in position until either compartment has received its full weight, one of said devices including a member having locking-surfaces at its upper angles and a weighted arm adapted to engage one of said surfaces at the completion of each movement of the member, and mechanism actuated by the sinking of the bucket when the compartment has been filled, whereby the locking devices are disengaged.

11. The combination with a suspended-compartment weighing-bucket having alternately opening and closing bottoms, a tilting directing-gate and connections by which the gate and bottoms are moved in unison, a segment concentric and movable in unison with the bottoms, a lever fulcrumed at one end and having the opposite end to engage the segment at the completion of each oscillation thereof, and having a hook-shaped member, rods projecting from a stationary part, one of which rods engages the said hook-shaped member, and a weighted lever fulcrumed to the receptacle and connected with the other stationary rod, and having an end adapted to strike the hook-shaped member of the other lever and release said last-named lever from the segment.

12. The combination in a weighing apparatus of a compartment weighing-bucket, having pivoted bottoms, a tilting diaphragm and mechanism by which it is turned to alternately supply material to be weighed to the compartments, and to open the bottoms after the weight is completed, a discharge-chute common to both compartments, an arm extending across the interior of the chute having one end fixed to a rocking shaft, a stop to limit the movement of the arm, a registering device carried by the chute, an arm and link connecting the movable part of the register with the shaft, and a spring by which the parts are returned to their normal position after the flow from the bucket has ceased.

In witness whereof I have hereunto set my hand.

GEORGE HOEPNER.

Witnesses:
S. H. NOURSE,
JESSIE C. BRODIE.